Patented Apr. 29, 1941

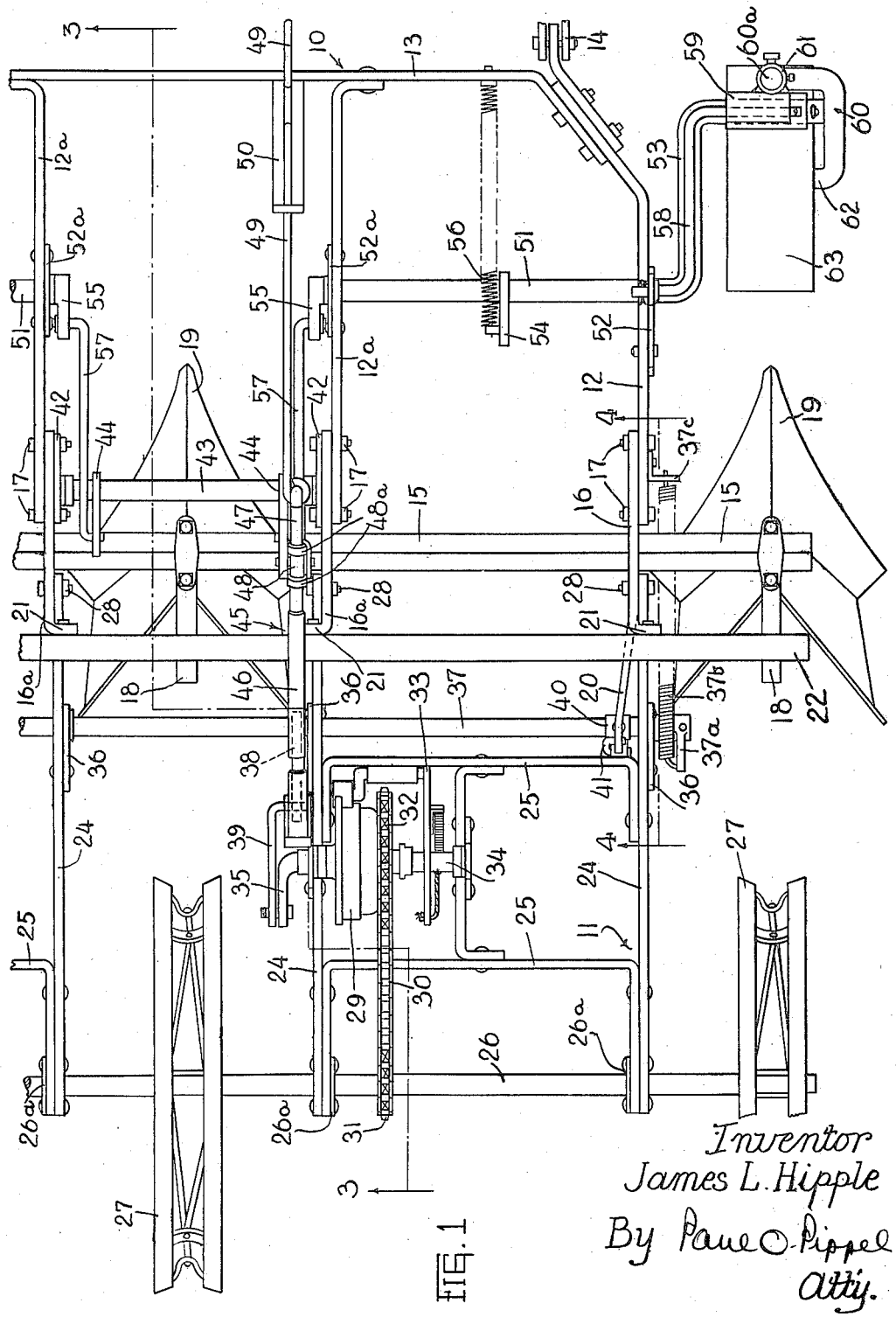

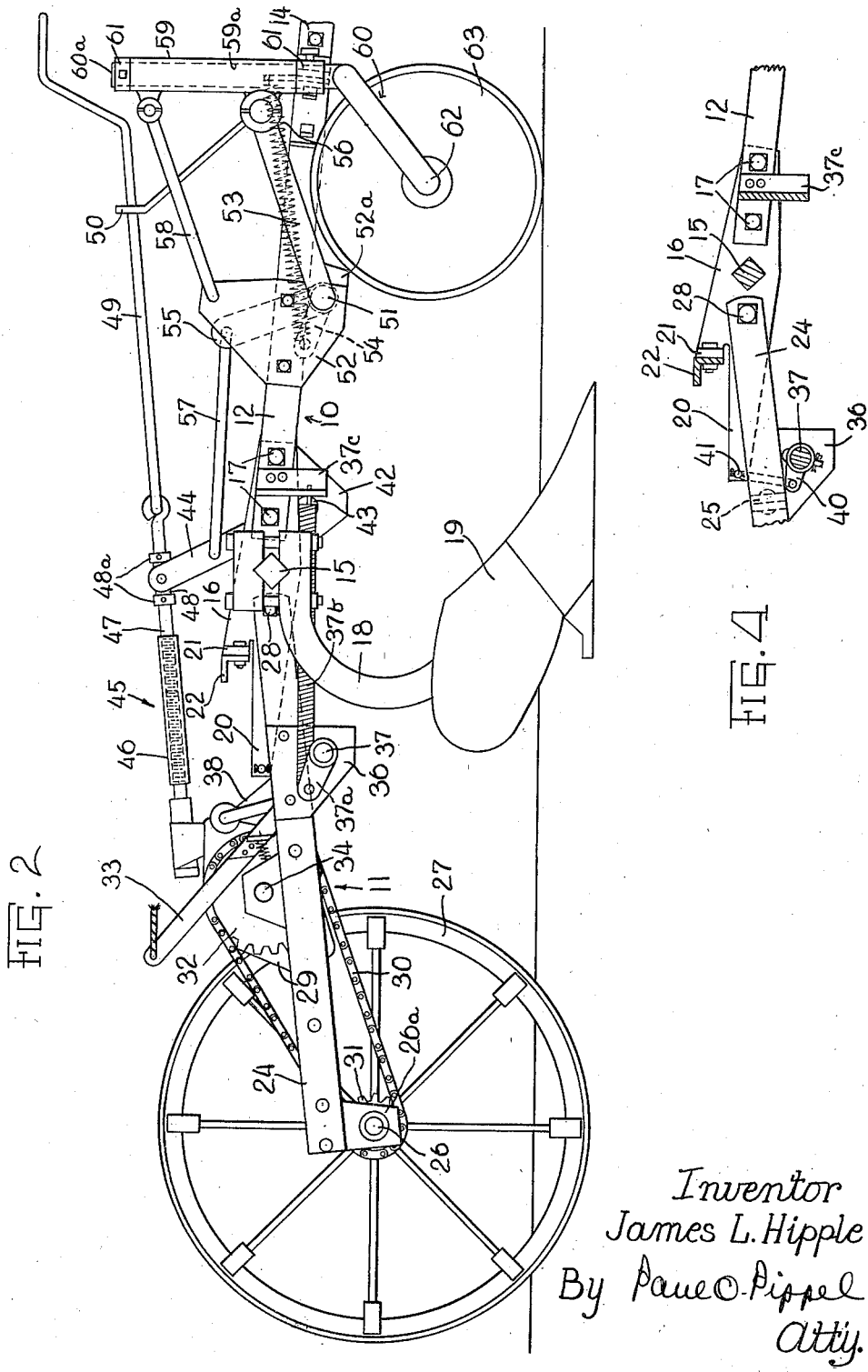

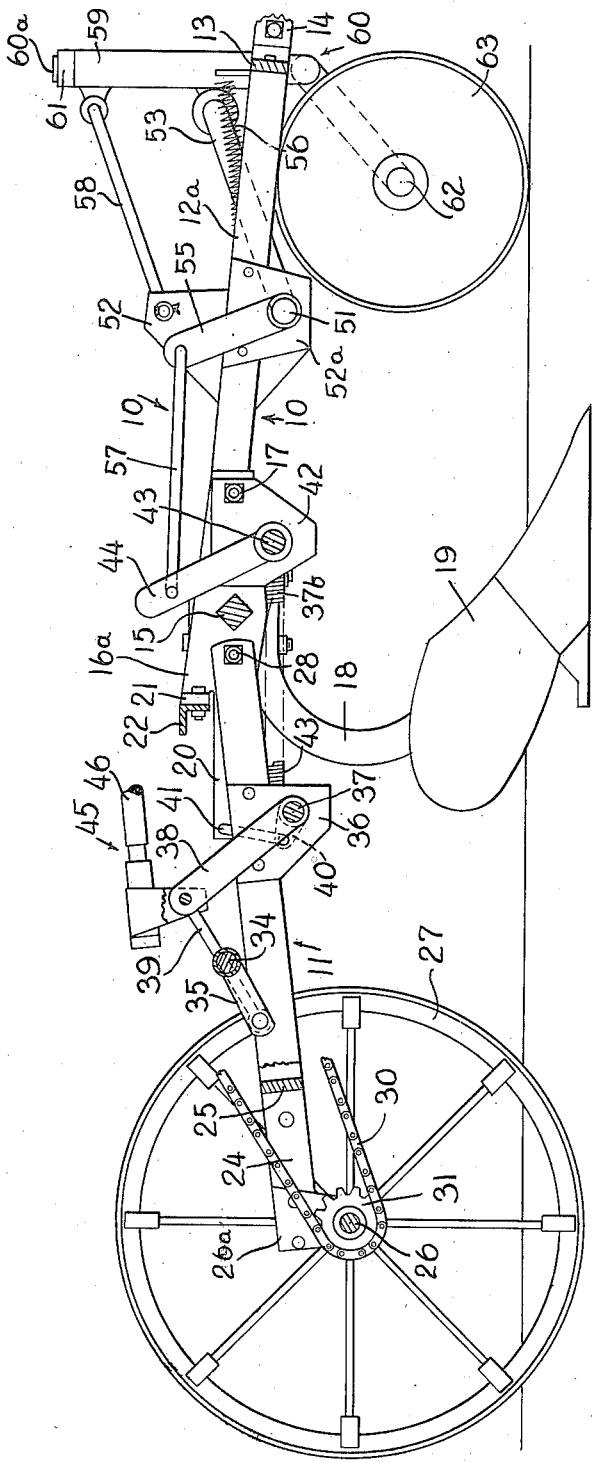

2,239,961

UNITED STATES PATENT OFFICE 2,239,961

TILLAGE IMPLEMENT

James L. Hipple, Canton, Ill., assignor to International Harvester Company, a corporation of New Jersey Application April 12, 1940, Serial No. 329,335

16 Claims. (Cl. 97—243)

The present invention relates generally to improvements in tillage implements including novel mechanism for lifting the tillage tools. Since this tillage implement operates in land where there is a good deal of tumble weed, it is desirable to lift the tillage tools high enough so that they will not become entangled in the weeds when entering or turning on the land.

It is an object of the invention to provide a novel means for raising the tillage tools of a tillage implement to a high clearance position.

Another object of the invention is to provide a novel means for raising the frame of a tillage implement to a high, substantially level position for transport.

Other objects and advantages of the invention will be apparent as the description proceeds.

For illustrating the invention, reference is made to the accompanying drawings, in which:

Figure 1 is a partial plan view of the tillage implement;

Figure 2 is a side view of the tillage implement;

Figure 3 is a sectional view taken along the line 3—3 of Figure 1; and,

Figure 4 is a sectional view taken along the line 4—4 of Figure 1, showing the front and rear frame pivotal connections.

The tillage implement shown includes a front or first frame 10, and a rear or second frame 11. The first frame 10 consists of a pair of longitudinally disposed outer bars 12 and a pair of longitudinally disposed inners bars 12a. Only one of the outer bars 12 is shown; however, the left side of the implement is provided with an outer bar similar to the outer bar 12, which is shown, and it is believed that a description of one side will suffice. The implement in this case operates on three rows, but could be also made into a two or four row machine. The front end of each of the bars 12 and 12a is connected to a transverse bar 13 to which any suitable hitch device 14 may be attached.

A tool bar 15 has secured thereon a pair of outer plates 16 and a pair of inner plates 16a. These plates are bolted at 17 to the rear ends of the frame members 12 and 12a. On the tool bar 15, standards 18 are adjustably secured. An earth-working tool 19 is secured at the end of each standard 18.

Each of the outer plates 16 is provided with a rearwardly extending portion 20 having an opening provided therein. The plates 16 and 16a are provided with a portion 21 to which is bolted a transverse angle 22 on which a planting attachment, not shown, may be attached.

The second frame 11 consists of a plurality of longitudinally spaced bars 24 connected in spaced relation by transverse braces 25. At the rear of the bars 24, an axle 26 is journaled in suitable bearings 26a. Press wheels 27 are journaled on the axle 26 in rear of and in line with the earth-working tools 19. The front ends of the bars 24 are pivotally connected to the plates 16 and 16a by bolts 28.

On the rear frame bars 24 and on the transverse braces 25 is mounted a power lift mechanism 29 of the half revolution type in wide use today. The power lift 29 is driven by a chain 30 which is trained around a sprocket 31 fixed on the axle 26, and a sprocket 32 provided on the power lift. The power lift is operated by a lever 33. A shaft 34 having a crank portion 35 extends from the power lift mechanism 29.

The bars 24 of the rear frame 11 are provided with plate members 36 in which a shaft 37 is journaled. The shaft 37 extends across the width of the rear frame and has an arm 38 secured thereto. A link 39 connects the arm 35 of the power lift 29 and the end of the arm 38. As shown in Figure 4, the shaft 37 also has an arm 40 secured thereon. The arm 40 is provided with an opening in which one end of a link 41 is inserted; the other end of which is inserted in the opening provided in the rearwardly extending portion 20 of the plate 16. An arm 37a is also fixed on the ends of the shaft 37 and a spring 37b is connected thereto and to a bracket 37c secured on the outer bar 12 of the front frame 10. The spring tends to rotate the shaft 37 in a clockwise direction.

On the inner bars 12a of the front frame 10 are secured plates 42 in which a shaft 43 is journaled. The shaft 43 has provided thereon arms 44.

An adjustable link 45 comprising a part 46 having a threaded opening is pivotally connected to the end of the arm 38 on the rock-shaft 36 and to the link 39, as shown in Figure 3. The adjustable link 45 also consists of a rod 47 the end of which is provided with a threaded portion adapted to cooperate with the threaded opening in the part 46. A trunnion 48 provided on the rod 47 is pivotally connected to the end of the arm 44 on the shaft 43. Collars 48a provided on the rod 47 at each side of the trunnion 48 hold the rod 47 against axial movement with respect to the trunnion. A crank 49 is connected to the end of the rod 47 and is supported in a bracket 50 secured to the transverse bar 13 on the front frame 10. Upon turning the crank 49, the arm 44 is moved and the rock-shaft 43 rotated.

On the front frame 10 a pair of shafts 51 are journaled in plates 52 and 52a which are secured to the outer bars 12 and inner bars 12a respectively. The shaft 51 has a crank portion 53 and arms 54 and 55. A spring 56 is connected to the arm 54 and the transverse bar 13 of the frame 10. Links 57 are connected to the arms 44 on the shaft 43 and the arms 55 on the shafts 51. The plates 52 extend above the outer bars 12 and links 58 are pivotally connected thereto. As shown in Figures 1 and 2, the crank portion 53 of the shaft 51 and the link 58 are arranged in substantially parallel relation and are connected to a part 59 having an opening 59a provided therein. An axle 60 having a vertical portion 60a is inserted in the opening 59a and held therein by collars 61. The axle 60 extends rearwardly and transversely to the vertical portion 60a to form an axle portion 62 on which a gauge wheel 63 is journaled. The gauge wheel 63 is alined with the earth working tools 19 and the rear wheels 27.

Referring to Figures 1 and 2, the tillage implement is shown in an operating position. The front frame 10 is supported on the gauge wheels 63, only one of which is shown, and the rear frame is supported on the rear wheels 27. The depth at which the earth working tool 19 operates is determined by the vertical location of the gauge wheel 63. To change the position of the earth working tools the crank 49 is turned so as to raise or lower the gauge wheel 63. This adjustment is accomplished through the movement of the arm 44 which turns the rock-shaft 43, which in turn, through the link 57, rotates the shaft 51. In other words, by adjusting the crank 49, the front and rear frames are raised or lowered about the rear wheel 27.

When it is desired, the tillage implement can be moved to a transport or raised position by actuating the lever 33. When the lever 33 is moved the power lift 29 is operated through the chain 30 which is trained around the sprockets 31 and 32, which rotates the shaft 34 and the crank portion 35, 180°.

The movement of the crank 35, through the link 39, moves the arm 38 and the arm 40 on the rock-shaft 37 in a clockwise direction. The arm 40, through the link 41, moves the rear end of the front frame upwardly until the arm 40 and the link 41 are in a dead center relation. The clockwise movement of the arm 38 moves the arm 44 on the rock-shaft 43 through the adjustable link 45, and the link 57, connected to the arm 44 and the arm 55, in turn rotates the shaft 51 in a clockwise direction, which moves the front and rear frames upwardly about the wheel supports for the rear frame.

By this arrangement of parts, the front frame is lifted into an approximately level position with respect to the operating positions of the front frame. The front and rear frames move about their pivotal connection, that is, the bolt 28, and simultaneously therewith the front and rear frames are moved upwardly about the axis of the rear wheels 27. In this way the earth working tools 19 are lifted to a high position, and additional lift can be accomplished by turning the crank 49.

From the foregoing description it will be apparent that a novel means has been provided to raise the frame of a tillage tool to a high level position. This adjustment is effected by movement of the parallel link mounted caster wheels. It is the intention to limit the invention only within the terms of the appended claims.

What is claimed is:

1. A tillage implement comprising a front frame, caster wheels connected to the front frame by parallel links, a rear frame pivoted to said front frame, for limited movement with respect thereto, wheel supports for said rear frame, a power lift mechanism mounted on said rear frame, and means connected to the power lift and to the parallel links in such a manner that upon operation of the power lift the parallel links will be moved up or down to raise or lower the front frame.

2. A tillage implement comprising a front frame having a tool bar, earth working tools secured on the tool bar, caster wheels connected to the front frame by parallel links, a rear frame pivotally connected to said front frame for limited movement with respect thereto, wheel supports for said rear frame, and a power lift operatively connected to said parallel links for adjusting said front frame.

3. A tillage implement comprising a front frame having a tool bar, earth working tools secured on the tool bar, caster wheels connected to the front frame by parallel links, a rear frame pivoted to said front frame, wheel supports for said rear frame, a power lift mounted on said rear frame, adjustable link means connected to the power lift and said parallel links for raising and lowering said front frame, and manual means associated with the adjustable link to effect adjustment of the front frame.

4. A tillage implement comprising a front frame, a rear frame pivoted to said front frame, a portion of said front frame extending rearwardly past the pivotal connection of said frames, a rock-shaft journaled on said rear frame, a link connected to said rock-shaft, a second link connected to the rearwardly extending portion of said front frame and to said first mentioned link to permit limited movement of the front frame relative to the rear frame, wheel supports for said rear frame, caster wheels connected to the front frame by parallel links, a power lift mounted on the rear frame, and a manually adjustable link connected to the power lift and to the parallel links for moving said parallel links up or down to raise or lower the frames.

5. In combination, a frame having a tool bar, caster wheels connected to the frame by parallel links, a second frame pivotally connected to the first frame, wheel supports for the second frame, power lift means carried by said second frame and operatively driven by said wheel supports, means connected to the first and second frames and adapted to permit limited movement of the first frame with respect to the second frame, and means connected to the power lift and to the parallel link caster wheels for raising or lowering the first and second frames about the wheel supports for the second frame.

6. In combination, a frame having a tool bar, caster wheels connected to the frame by parallel links, manual means for adjusting said caster wheels, a second frame pivotally connected to the first frame, wheel supports for the second frame, power lift means carried by said second frame, means connected to the power lift and to the first frame and adapted to permit limited movement of the two frames, and means connected to the power lift and to the parallel link mounted caster wheels for adjusting said links by power from the power lift.

7. In combination, a first frame, wheels, parallel links connecting the frame and the wheels, a second frame pivotally connected to the first frame, wheel supports for the second frame, means operatively connected to the first frame and to the second frame for adjusting said frames with respect to one another, and means for adjusting the parallel link mounted wheels to raise or lower the first and second frame about the wheel supports for the second frame.

8. In combination, a first frame, wheels, parallel links connecting the frame and the wheels, a second frame pivotally connected to the first frame, wheel supports for the second frame, and means operatively connected to the first frame and to the second frame for adjusting said frames with respect to one another, and means operatively connected to said first named means and to the parallel link mounted wheels for adjusting the first frame and second frame about the wheel support for the rear frame.

9. A tillage implement comprising a front frame having a tool bar, earth-working tools secured on said tool bar, a rear frame pivoted on the front frame, press wheels carrying the rear frame, a pair of transverse shafts having crank portions journaled on the front frame, links arranged in parallel relation to said crank portions pivotally connected to the front frame, members each having an opening connected to the ends of the crank portions and the links, spindles journaled in said members, a wheel journaled on each of said spindles for supporting the front frame, a power lift mechanism mounted on said rear frame and operatively driven from said press wheels, a rock-shaft journaled on the front frame, a rock-shaft journaled on the rear frame, a link connected to the power lift and the rock-shaft on the rear frame, a manually adjustable link connected to the rock-shaft on the rear frame and the rock-shaft on the front frame for moving said front rock-shaft, and links connected to said front rock-shaft and to crank portions of said transverse shaft, whereby upon operation of the power lift the wheels on the front frame will be moved downwardly and the earth working tools lifted out of the ground.

10. A tillage implement comprising a front frame having a tool bar, earth working tools secured on said tool bar, a rear frame pivoted to the front frame, press wheels carrying the rear frame, a pair of wheels connected to the front frame by means of parallel links, a power lift mechanism mounted on said rear frame and operatively driven from said press wheels, a rock-shaft journaled on the front frame, a rock-shaft journaled on the rear frame, a link connected to the power lift and the rock-shaft on the rear frame, an adjustable link connected to the rock-shaft on the rear frame and the rock-shaft on the front frame, and links connected to said front rock-shaft and to one of the links of each pair of parallel links, whereby upon operation of the power lift the wheels on the front frame will be moved downwardly and the earth working tools lifted out of the ground.

11. A tillage implement comprising a front frame having a tool bar, earth working tools secured on said tool bar, a rear frame pivoted to the front frame, press wheels carrying the rear frame, a pair of transverse shafts having crank portions journaled on the front frame, links arranged in parallel relation to said crank portions pivotally connected to the front frame, members each having an opening connected to the ends of the crank portions and the links, spindles journaled in said members, a wheel journaled on each of said spindles for supporting the front frame, a power lift mechanism mounted on said rear frame and operatively driven from said press wheels, a rock-shaft journaled on the front frame, a rock-shaft journaled on the rear frame, a link connected to the power lift and the rock-shaft on the rear frame, an adjustable link connected to the rock-shaft on the rear frame and the rock-shaft on the front frame, and links connected to said front rock-shaft and to crank portions of said transverse shaft, whereby upon operation of the power lift the wheels on the front frame will be moved downwardly and the earth working tools lifted out of the ground.

12. A tillage implement comprising a front frame having a tool bar, earth working tools secured on the tool bar, caster wheels connected to the front frame by parallel links, manual means for adjusting said parallel links, a rear frame pivotally connected to the front frame, wheel supports for the rear frame, portions of the front frame extending rearwardly past the pivotal connections of the two frames, a power lift mechanism carried by the rear frame and adapted to be operatively driven from the rear frame wheel supports, and link means connected to the power lift and to the rearwardly extending portions of the front frame and to the parallel link mounted caster wheels, whereby when the power lift is operated the rearwardly extending portions of the front frame will be moved a predetermined amount with respect to the rear frame and the parallel link mounted caster wheels will be moved downwardly to lift the front and rear frames about the wheel supports for the rear frame.

13. A tillage implement comprising a front frame having a tool bar, earth working tools secured on the tool bar, caster wheels connected to the front frame by parallel links, a rear frame pivotally connected to the front frame, wheel supports for the rear frame, portions of the front frame extending rearwardly past the pivotal connections of the two frames, a power lift mechanism carried by the rear frame and adapted to be operatively driven from the rear frame wheel supports, and link means connected to the power lift and to the rearwardly extending portions of the front frame and to the parallel link mounted caster wheels, whereby when the power lift is operated the rearwardly extending portions of the front frame will be moved a predetermined amount with respect to the rear frame and the parallel link mounted caster whels will be moved downwardly to lift the front and rear frames about the wheel supports for the rear frame.

14. A tillage implement comprising a front frame, caster wheels connected to the front frame by parallel links, a rear frame pivotally connected to the front frame, wheel supports for the rear frame, portions of the front frame extending rearwardly past the pivotal connections of the two frames, a rock-shaft journaled on said rear frame, arms provided on said rock-shaft, links connected to said arms and to the rearwardly extending portions of the front frame, a power lift mechanism carried by the rear frame and adapted to be operatively driven from the rear frame wheel supports, link means connected to the power lift and to one of the arms of the rock-shaft on the rear frame, a rock-shaft journaled on the front frame, arms provided on said rock-shaft, a manually adjustable link connected to an arm on said rock-shaft on the rear frame and to the arms on said rock-shaft on the front frame, and links connected to arms on the rock-shaft on the front frame and to the parallel link mounted caster wheels, whereby upon operation of the power lift the rearwardly extending portions of the front frame will be moved a predetermined amount with respect to the rear frame and the parallel link mounted caster wheels will be moved downwardly lifting the front and rear frames about the wheel supports for the rear frame.

15. A tillage implement comprising a front frame having a tool bar, earth working tools secured on the tool bar, a pair of transverse shafts having crank portions and arms journaled on the front frame, links arranged in parallel relation to said crank portions pivotally connected to the front frame, caster wheels connected to the ends of said parallel links, a rear frame pivotally connected to the front frame, wheel supports for the rear frame, portions of the front frame extending rearwardly past the pivotal connection of the two frames, a power lift mechanism carried by the rear frame and adapted to be operatively driven from the rear frame wheel supports, a rock-shaft journaled on the rear frame, arms provided on the rock-shaft, a link connected to the power lift and one of the arms on the rock-shaft, links connected to arms on the rock-shaft and to the rearwardly extending portions of the front frame, a rock-shaft journaled on the front frame, a manually adjustable link connected to an arm on the rock-shaft on the rear frame and to an arm on the rock-shaft on the front frame, and links connected to the arms on the rock-shaft on the front frame and to arms on the pair of transversely journaled shafts on the front frame, whereby power from the power lift can be transmitted to move the rear of the front frame a predetermined amount with respect to the rear frame and move the pair of transverse shafts on the front frame including the parallel link caster wheels downwardly to raise the front and rear frame about the rear frame wheel supports.

16. A tillage implement comprising a first frame having a tool bar, earth working tools connected to said tool bar, wheels, parallel links connecting the frame and the wheels, a second frame pivotally connected to the first frame, wheel supports for said second frame, a power lift mechanism carried by the second frame and adapted to be operatively driven by the second frame wheel supports, and means operatively connected to the power lift and the first frame for adjusting the first frame with respect to the second frame, and means connected to said first-mentioned means and to the parallel links for adjusting said links.

JAMES L. HIPPLE.